3 Sheets—Sheet 1.

W. L. CARD & D. S. RANDOLPH,

Assignors, by mesne assignments, to THE AMERICAN BRAKE CO.

Automatic Car Brake.

No. 9,682. Reissued April 26, 1881.

*Witnesses:*

E. S. Hyer

*Inventors*

William L. Card

David S. Randolph by F. W. Ritter Jr. Atty

N. PETERS, PHOTO-LITHOGRAPHER, WASHINGTON, D. C.

W. L. CARD & D. S. RANDOLPH,
Assignors, by mesne assignments, to THE AMERICAN BRAKE CO.

Automatic Car Brake.

No. 9,682. Reissued April 26, 1881.

Witnesses:
E. F. Neale
C. S. Hyer

Inventors:
William L. Card
David S. Randolph
by F. W. Ritter Jr. atty

N. PETERS, PHOTO-LITHOGRAPHER, WASHINGTON, D. C.

3 Sheets—Sheet 3.
W. L. CARD & D. S. RANDOLPH,
Assignors, by mesne assignments, to THE AMERICAN BRAKE CO.
Automatic Car Brake.
No. 9,682. Reissued April 26, 1881.
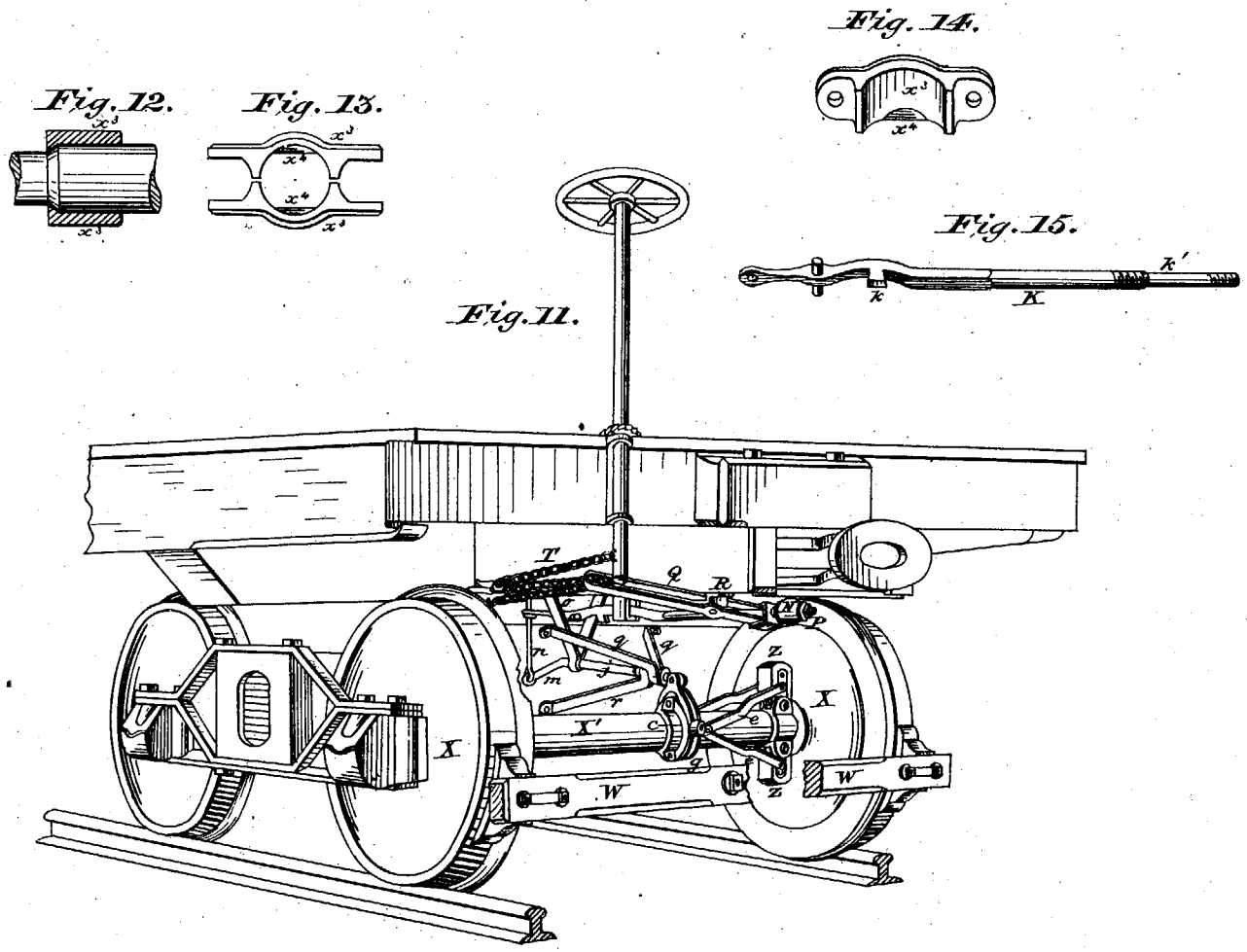
Witnesses:
E. A. Teale
C. S. Hyer
Inventors
William L. Card
David S. Randolph
by F. W. Ritter Jr atty
N. PETERS, PHOTO-LITHOGRAPHER, WASHINGTON, D. C.

UNITED STATES PATENT OFFICE.

WILLIAM L. CARD, OF LA CROSSE, WISCONSIN, AND DAVID S. RANDOLPH, OF ST. LOUIS, MISSOURI, ASSIGNORS, BY MESNE ASSIGNMENTS, TO THE AMERICAN BRAKE COMPANY, OF ST. LOUIS, MISSOURI.

AUTOMATIC CAR-BRAKE.

SPECIFICATION forming part of Reissued Letters Patent No. 9,682, dated April 26, 1881.

Original No. 231,535, dated August 24, 1880. Application for reissue filed March 18, 1881.

*To all whom it may concern:*

Be it known that we, WILLIAM L. CARD, of La Crosse, in the county of La Crosse, State of Wisconsin, and DAVID S. RANDOLPH, of St. Louis, in the county of St. Louis and State of Missouri, have invented certain new and useful Improvements in Automatic Car-Brakes; and we do hereby declare the following is a full, clear, and exact description of the invention, that will enable others skilled in the art to which it appertains to make and use the same, reference being had to the accompanying drawings, and to the letters of reference marked thereon, which form a part of this specification.

Our invention relates to apparatus for attachment to an ordinary car and one of its trucks, and operating to apply the brakes, automatically, on the forcing inward of the draw-bar, by its impact with the draw-bar of another car when the cars are at speed. The construction and consequent operation is such that should the draw-bar be forced inward when the cars are at rest the brakes will not be applied.

The main object to be attained by the present invention is to prevent the movement of the draw-bar from applying the brakes when the train is being pushed, and in case the train should be running through a sag in the grade after descending one grade and before ascending another, in which the service of the pusher should still be required. So far as we are aware this result has never been attained prior to our invention.

We will now proceed to describe our invention, so that others skilled in the art to which it appertains may apply the same.

Figure 1:
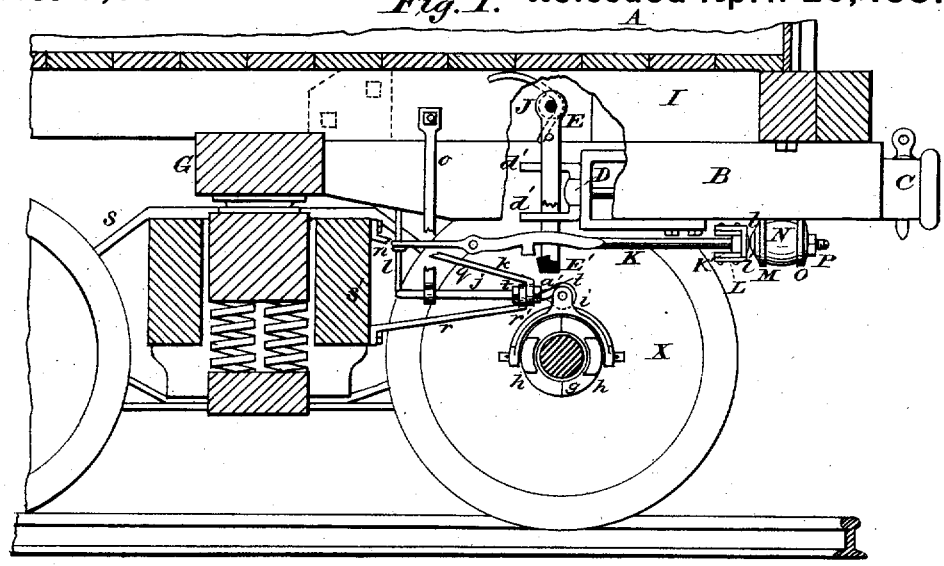
Figure 2:
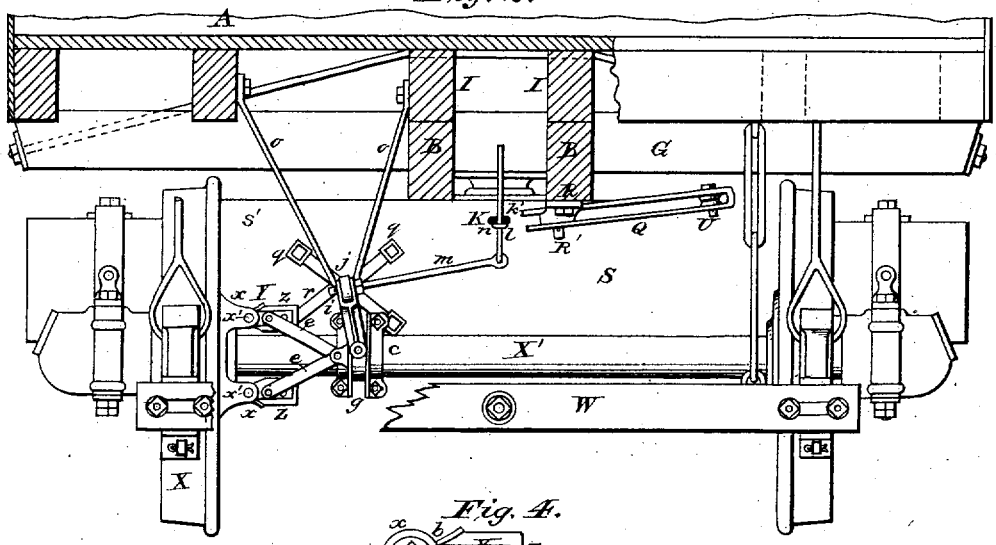
Figure 4:
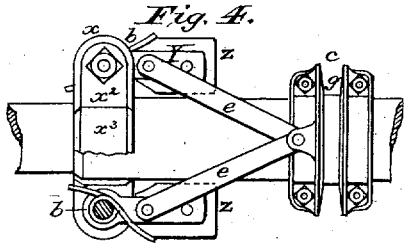
Figure 3:
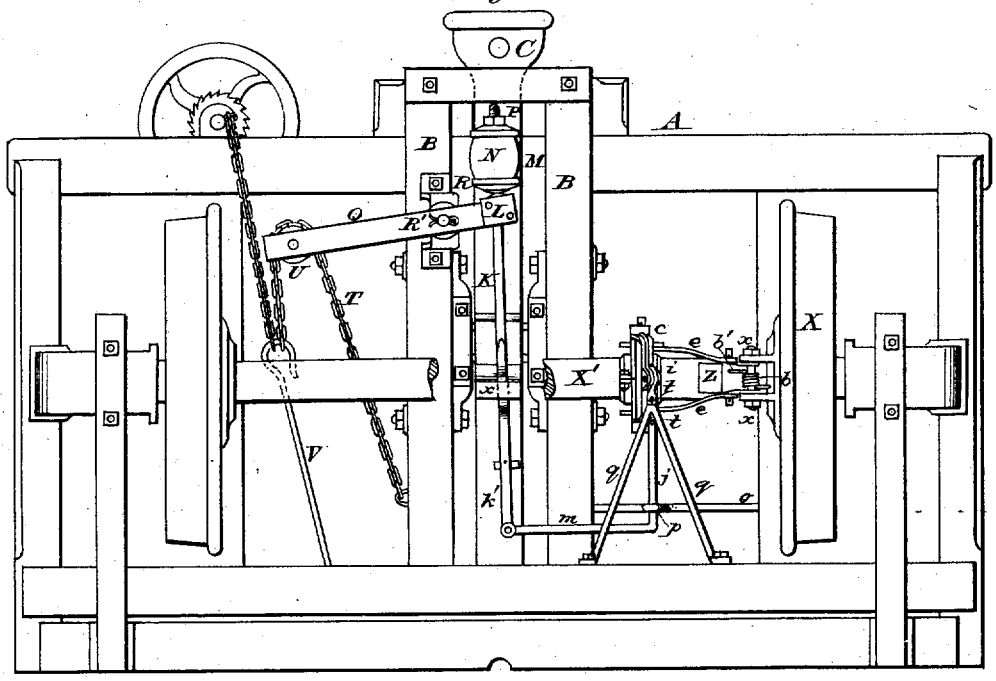
Figure 5:
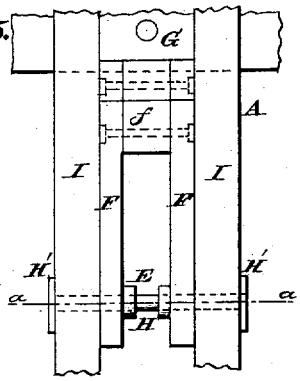
Figure 7:
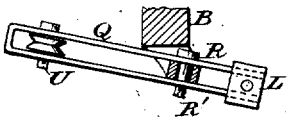
Figure 9:
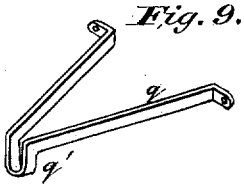
Figure 8:
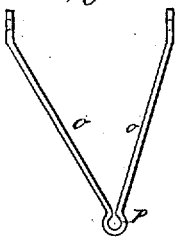
Figure 10:
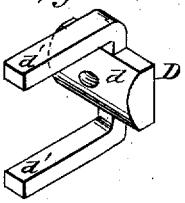
Figure 6:
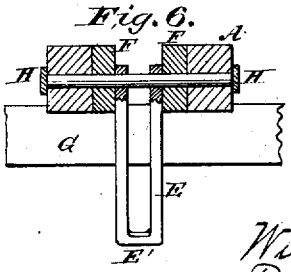

In the drawings, Figure 1 is a longitudinal section of a car and truck. Fig. 2 is a part end view and part transverse section of the same. Fig. 3 is an under view of the same. Fig. 4 is an enlarged under view of the actuating device in a modified form. Fig. 5 is a top view of a portion of the bolster and sills or floor-timbers of a car, showing the manner of attaching to them the blocks or frame on which, jointly with the floor-timbers, the hanging lever which actuates the pull-rod is supported. The frame is introduced to give additional strength. Fig. 6 is a section at *a a*, Fig. 5. Fig. 7 is a side view of the automatic brake-lever, with bracket and pulley attached. Fig. 8 is a side view of the rock-shaft hanger. Fig. 9 is a perspective view of one of the bars of the rock-shaft bracket. Fig. 10 is a perspective view of the push-nut which is attached to the rear end of the draw-bar to actuate the hanging lever. Fig. 11 is perspective view of one end of a car and truck. Fig. 12 is a sectional view of the fixed sleeve on the axle. Fig. 13 is an end view of the same, and Fig. 14 is a perspective view of one-half of same. Fig. 15 is a perspective view of the pull-rod.

Like letters refer to like parts wherever they occur.

A indicates part of a car-body. B B are draft-timbers attached to the bottom of the same, and between which the draw-bar C works, and to which it is connected in the usual or any suitable manner. The draw-bar C has the usual or any suitable construction. ordinarily constructed, the draw-bar C has a screw stud or bolt, which passes longitudinally through the center of the spring-pocket, and extending axially from the inner end of the draw-bar. Upon this bolt screws the push-nut D, with a curved bearing-face, *d*, bearing against the sides of the U-shaped lever E, fulcrumed at its upper end to the frame or bars F F and the sills I I of the car-body. The side bars of the frame F F are shown bolted together at the inner ends upon a distance-block, *f*, and that end fitted to the bolster G with a rabbet-notch; or it may be fitted squarely against the blocking, often being placed between the sills I I where they pass over the bolster G.

The push-nut D above-described is not absolutely essential, as it may be omitted, and the draw-bar allowed to act directly upon the U-shaped lever E by so bending the lever E that the side next to the draw-bar shall be convex.

The fulcrum-pin H passes through the sills I I of the car-body, and also the bars of the fulcrum-frame F F between them. Said pin is held in position by wooden or other suitable caps, H′ H′, attached to the outsides of the sills I I. Said fulcrum-pin passes through the upper ends of the lever E, so as to constitute its fulcrum and support. The lever E is kept in contact with the draw-bar or push-nut D by a spring, J, or by gravity. The push-nut has two prongs, $d'$ $d'$, which extend between the legs of the lever E, so as to prevent the nut from turning, and to form a guide for the lever.

K is a pull-rod, extending through between the legs of the lever E. This rod has a double-acting projection, $k$, upon its under side, for engagement with the lower end or bend, E′, of the pendent lever E when the cars are at speed. It will be seen that the hook-projection $k$ of this pull-rod may be made to engage the catch E′ of the pendent lever E upon either the inner or outer side thereof. The purpose of making the hook-projection $k$ to engage with and carry the lever E outward on the outward movement of the pull-rod when the cars are at speed will be made clear by the following explanation:

In starting a train of cars on leaving a station all of the draw-bars are pulled out more or less. As speed is attained the automatic mechanism, hereinafter described, will lower the free end of the pull-rod K, and its hook or projection $k$ will then engage the catch E′ of the pendent lever E upon its inner side in such manner that the brakes will be applied whenever the draw-bar is pressed inward by impact against the draw-bar of another car, so long as the cars are running at speed. On the contrary, where an extra engine is used as a pusher—as on heavy grades—the draw-bars of some of the cars are pushed inward by the force of the engine in the rear, and this forces the lower end of the pendent lever E inward, so that when the automatic mechanism above referred to and hereinafter described lowers the inner end of the pull-rod K its hooked projection $k$ will engage the opposite or outer side of the catch E′ of the pendent lever E in such manner as to restrain its outward movement past the hook $k$ should the draw-bars happen to be stretched outward (while using a pusher-engine) by such contingency as the train running through a sag in the grade after descending one grade and before ascending another, in which the service of the pusher should be still required. This construction therefore effectually prevents the rear engine (acting as a pusher) from setting the brakes on the cars pushed by it under any circumstances, while at the same time the forward engine (which is pulling) has complete control over the brakes upon all the cars which it pulls.

The outer end of the pull-rod K passes through a bracket-plate or strap, L, attached to the inner end of the brake-lever Q, and carries an adjusting-nut, K′, inclosed or embraced by the strap or bracket-plate L. The pull-rod also passes through a sliding collar, M, which forms the inner bearing of a spring, N, whose outer bearing is against a collar, O, held in position on the rod K by means of a compressing-nut, P, which gives a means for increasing or diminishing the force of spring N. The inner side of the collar M is made convex, and bears against a convex knob, $l'$, upon the strap or bracket L. These surfaces are made convex, to prevent the binding of the parts when the pull-rod is in action, or when the tension of the spring N is changed.

K′ is a nut screwing upon the pull-rod and bearing against the inner side of the strap or bracket L. The sides of the strap embrace the nut K′ and prevent it turning upon the pull-rod.

It will be seen that the nuts K′ and P furnish a means for lengthening or shortening the pull-rod between the catch $k$ and the nut P, or between the catch and the bearing M $l'$, to fit it to cars of slightly-varying construction.

The strap or bracket L is hinged to one end of the automatic brake-lever Q, and the lever is fulcrumed upon a stud or pin, R′, upon a bracket, R, attached to one of the draft-timbers B.

The lever Q, in its preferred form, consists of two parallel bars. Between such bars, at the free end, is a grooved pulley, U, around which passes a chain, T, one end of which is attached to the draft-timber B, and the other end to the ordinary brake-rod V, connected by the ordinary brake mechanism with the brake-beams, one of which is shown at W.

In comparing the distance moved by the draw-bar with that of the brake-beams, to arrive at the power of the brake, it will be seen that the lower end, E′, of the lever E has about twice the movement of the draw-bar C, as shown. This movement being communicated to the shorter end of the automatic brake-lever Q by means of the pull-rod K, the free end of the lever Q will have six times the movement of the draw-bar, and as this movement is doubled upon the free end of the brake-chain T, as a result of its passing around the pulley U, the brake-rod V, to which it is attached, may be made to have twelve times the movement of the draw-bar, more or less, as required. From this point—viz., the movement of the brake-rod V—the leverage is reversed in the ratio of four to one, thus giving a movement of one and one-half inch to each brake-beam W for one inch movement of the draw-bar C.

We will now describe the mechanism for rendering the brake perfectly automatic.

$x$ $x$ are lugs, cast upon the inner side of the wheel X, or attached thereto in any proper manner, or attached to the axle by a collar, $x^3$ $x^3$, bolted thereon, as shown in Figs. 4 and 12. The part of the axle within the hub of the wheel X is somewhat reduced in diameter, so that just inside of the wheel is a circumferential groove, $x^2$, which gives facility for the firm attachment of the collar $x^3$ $x^3$ to the axle. Thus one or both of the parts $x^3$ of the collar has a rib, $x^4$, fitting in the groove $x^2$, as shown in Figs. 4, 12, 13, and 14.

To the lugs $x$ are pivoted arms Y, carrying centrifugal blocks or weights Z at the free ends.

The blocks or weights Z and their connecting-arms Y may be each one piece. These arms are supported and have oscillatory motion on pivot-bolts $x'$ $x'$, which pass through eyes in the inner ends of arms Y and corresponding holes in the lugs $x$ $x$ on the collar $x^3$ $x^3$, as shown in Fig. 4, or wheels, as in Fig. 2. The bolts $x'$ carry springs $b$, which tend to hold the weights in contact with the axle X′. The springs $b$ are made with a central helix surrounding the pivot-bolt $x'$, and with projecting ends bearing, one end against the block Z, and the other end against the wheel or axle, or object fixed to same.

It will be seen that with the described construction, when the proper proportion is maintained between the weight of the blocks Z and the tension or strength of the springs $b$, when the car attains speed the rotary motion imparted to the blocks Z will develope sufficient centrifugal force therein to overcome the force of the springs $b$, and the blocks will swing outward at a right angle to the axle X′, and that as the speed is reduced the centrifugal force will diminish and be gradually overcome by the springs $b$, so that the blocks will be pressed inward and again brought in contact with the axle X′.

$c$ is a collar sliding endwise on the axle and revolving with it. This collar is connected to the side arms, Y, or blocks Z by toggle-links $e$ $e$, preferably upon both sides, as seen in Fig. 3. The outward movement of the weights or blocks Z from the axle will draw the collar $c$ toward the wheel, and vice versa. This collar $c$ has a circumferential groove, $g$, receiving the shoes $h$ of the forked arm $i$ upon the rock-shaft $j$, so that the endwise sliding movement of the grooved collar $c$ will cause the rocking movement of the shaft $j$. In the preferred form the forked arm $i$ is attached to the rock-shaft by a joint, as shown in Figs. 1, 2, 3, and 11. This jointed connection, however, is not absolutely essential, as the rock-shaft and forked arm may be made in one piece without serious detriment, and their functions be performed in a satisfactory manner.

The rock-shaft $j$ has an oscillating arm, $m$, whose free end carries an ascending lifting-rod, $l$, that passes through an eye in the inner end, $k'$, of the pull-rod K. The lifting-rod $l$ has a collar, $n$, by which the free end of the pull-rod is lifted when the arm $m$ ascends, and when the arm $m$ descends the pull-rod descends with it until the rod reaches the catch E′ of the lever, which then sustains the rod until again lifted by the arm $m$ by means of rod $l$ and collar $n$.

When the rod K rests on the catch E′ the rod $l$ may slip down through the eye in the pull-rod without carrying the pull-rod down with it, thus avoiding strain of all the parts of the mechanism connected with the rod K and shaft $j$, and relieving the shoes $h$ from unnecessary strain and friction. The lifting-rod $l$ and its collar $n$ are not, however, absolutely essential, as both might be dispensed with by a slight modification. For instance, the arm $m$, in its upward movement, might be brought in direct contact with the under side of the pull-rod, near its free end, so that it would raise and lower the free end $k'$ of the pull-rod substantially in the same manner as the preferred mechanism above described.

The rock-shaft $j$ is supported at one end by a V-formed hanger, $o$, whose ends are attached to the body of the car, (see Fig. 2,) and whose middle or lower part is bent into an eye, $p$, to give a suitable bearing to the rock-shaft. (See Fig. 8.) The other end of the rock-shaft is supported on a spider-bracket, which consists of two V-formed bars, $q$ and $r$, attached to the face of the cross-timber $s$ of the truck S′. The bearing-eye $q'$, Fig. 9, of the upper member, $q$, is turned down, lapping over the upturned bearing-eye $r'$ of the lower member, $r$, so as to form a lock by the weight of the shaft in its bearing. This lock is also maintained by means of the collars $t$ $t$, as seen in Figs. 1 and 3. The lower member, $r$, forms the strut of the bracket-frame, and the upper member, $q$, the stay. The collars $t$ $t$ at each side of the bearing $q'$ $r'$ also prevent the endwise movement of the rock-shaft $j$. The arm $m$ is at that end of the rock-shaft supported upon the car-body by means of the hanger $o$. It will follow that this end of the rock-shaft will partake of all the vertical and lateral movements of the car-body. The other end of the rock-shaft is supported from or upon the truck by means of the above-described spider-bracket $q$ $r$, and this end therefore partakes of all the movements of the truck.

It will be seen that the bearings $q'$ $r'$ of the bracket form the central point of oscillation for that end of the rock-shaft to which is attached the forked arm $i$, to which movement is imparted by the grooved collar $c$ by means of its endwise movement, induced by the centrifugal blocks Z; also, that the eye $p$ of the hanger $o$, which is attached to the car-body, is the central point of oscillation for that end of the rock-shaft which carries the oscillating arm $m$, whose office is to raise and lower the pull-rod out of and into engagement with the lower end, E′, of the pendent lever E; also, that the pull-rod, being carried and supported entirely from the car-body, must, as a natural consequence, partake of all the movements of the car-body.

It will now be seen that the movements of the rock-shaft caused by the sliding collar $c$ by means of the forked arm $i$ will be certain and reliable, because the center of oscillation at $q'$ $r'$, above set forth, for all these parts partakes of all the movements of the truck; and also that the result of the vibrating movements of the arm $m$ of the rock-shaft will be certain and reliable, because the center of oscillation for this part of the mechanism at $p$, as above set forth, partakes of all the movements of the car.

To obtain best results with the least wear and tear it is absolutely necessary that the bearings or supports for the rock-shaft should be attached as above described, one to the truck and the other to the car-body. Otherwise the effect is modified by the amount of load upon the car, producing a greater or less depression upon the body of the car by depressing the springs in the truck; also by the side lurch of the body upon the hangers in the truck upon which it is carried; also by the truck being elevated at one end by inequalties in the surface of the track and by curvature of the track. A practical result may be attained, however, with our mechanism by supporting both ends of the rock-shaft upon the truck in any suitable manner; but it is less satisfactory in many respects.

We do not confine ourselves to the form of bracket *q r* or hanger *o* shown to support the rock-shaft, as they may be varied indefinitely as exigencies may arise to conform to the construction of various cars, or for economy in weight of material, the essential characteristic being that they support the rock-shaft from the truck at one end and from the car at the other, or in any manner so as not to interfere with its duty of controlling the vertical movement of the inner end, *k'*, of the pull-rod K.

The operation of the various parts having been described in detail it is unnecessary to give a general description of the same. We will, however, say that when the cars are not running at least at a moderate speed, the double hooked projection *k* of the pull-rod K is held above and out of engagement with the catch E' of lever E, so that the pull-rod is not affected by the inward and outward movement of the draw-bar and lever E. When, however, the draw-bar is extended and the cars at a moderate speed, the inward movement of the draw-bar applies the brakes, and they remain set until the draw-bar is again moved outward. This operation of applying and releasing the brakes may be repeated at the pleasure of the engine-driver until the train comes to a full stop or the speed has been so reduced that the tension of the springs *b b* will overcome the centrifugal force of the blocks Z Z.

It will be understood that the cars may be backed without setting the brakes, because when the draw-bar is thereby forced inward the projection *k* on the pull-rod will be above the bar E'. Should sufficient speed be obtained while backing to lower the catch *k* into engagement with the catch-bar E', it will engage it on the outer side, and thus effectually prevent the possibility of setting the brakes, as above set forth in describing the action of a pusher-engine.

Having thus described our invention, what we claim and desire to secure by Letters Patent, is—

1. In an automatic car-brake, the combination, with a movable draw-bar, of a pull-rod provided with a catch or detent, a governor for controlling the pull-rod, and a pendent lever operated by the draw-bar for the purpose of preventing the application of the brakes when a pushing-engine is used, substantially as specified.

2. In an automatic car-brake, the combination, with a movable draw-bar, of a pull-rod provided with a double-acting catch or detent, a governor for controlling the pull-rod, and a pendent lever operated by the draw-bar, substantially as and for the purpose specified.

3. The combination, in a car-brake, of a movable draw-bar, a pendent lever operated thereby, a pull-rod actuated by the pendent lever, and a brake-lever operated by the pull-rod, substantially as specified.

4. The combination, with a movable draw-bar and pendent lever operated thereby, of a push-nut provided with prongs or guides for the pendent lever, substantially as specified.

5. The combination, with a brake-lever and a pendent lever operated by the draw-bar, of a pull-rod having a projection to engage with the pendent lever and an adjustable nut for adjusting the pull-rod to cars of varying construction, substantially as specified.

6. The lever Q, pivoted to the supporting-bracket R, and carrying on its outer end the grooved chain-pulley, and having on its inner end a bracket-plate, in combination with the collar M and the pull-rod, substantially as and for the purpose specified.

7. A car-wheel provided with lugs or ears on its inner face, in combination with centrifugal blocks and pivot-bolts, substantially as and for the purpose specified.

8. The combination of the draw-bar C and push-nut with the pendent lever E and spring J, substantially as and for the purpose specified.

9. In an automatic car-brake, the combination, with a car having a movable draw-bar for operating the brakes, of a swiveling truck, a centrifugal governor mounted upon the axle or wheel-hub, and intermediate mechanism, substantially as described, mounted on the truck for transmitting the movements of the governor to the brake mechanism, substantially as and for the purpose specified.

10. The combination of the spider-bracket *q r* and hanger *o* with the rock-shaft *j*, for the purpose of supporting said rock-shaft from the truck and car, substantially as and for the purpose specified.

In testimony whereof we affix our signatures in presence of two witnesses.

WILLIAM L. CARD.
DAVID S. RANDOLPH.

Witnesses as to signature of William L. Card:

A. STEINLEIN,
E. E. CHASE.

Witnesses as to signature of David S. Randolph:

T. P. ROCLIN,
L. D'ESTOUVILLE.